United States Patent [19]

Lampert

[11] Patent Number: 4,852,963
[45] Date of Patent: Aug. 1, 1989

[54] OPTICAL FIBER BICONIC CONNECTOR

[75] Inventor: Norman R. Lampert, Norcross, Ga.

[73] Assignee: American Telephone and Telegraph Company, AT&T Bell Laboratories, Murray Hill, N.J.

[21] Appl. No.: 68,586

[22] Filed: Jun. 30, 1987

[51] Int. Cl.⁴ .................................................. G02B 6/38
[52] U.S. Cl. .................................. 350/96.21; 350/96.2
[58] Field of Search ............................ 350/96.2, 96.21

[56] References Cited

U.S. PATENT DOCUMENTS

| | | | |
|---|---|---|---|
| 4,615,581 | 10/1986 | Morimoto | 350/96.21 |
| 4,634,214 | 1/1987 | Cannon, Jr. et al. | 350/96.2 |
| 4,687,291 | 8/1987 | Stape et al. | 350/96.21 |
| 4,721,357 | 1/1988 | Kovalchick et al. | 350/96.2 |

*Primary Examiner*—John D. Lee
*Assistant Examiner*—John Ngo
*Attorney, Agent, or Firm*—Edward W. Somers

[57] ABSTRACT

In an optical fiber connector (20), an alignment sleeve (66) for holding two conically shaped portions (30-30) of plug (24-24) of plug assemblies (22-22) each of which terminates an optical fiber (25) of a cable (35) includes two conically shaped cavities (68,70) communicating through a common plane (72). The conically shaped portion of each plug is urged toward the center of the sleeve by a spring (44). Each plug assembly at its cable entrance end is provided with an end retainer (80) having a central opening which is larger than the cross sectional area of the plug body but not of a retaining ring (42) disposed around the plug. When caps (46-46) of the plug assemblies are mounted and turned into a coupling housing (57) which encloses the sleeve and which is supported by a panel, the sleeve is maintained in a floating position under the urging of each plug. The sleeve together with the plugs therein is capable of movement prior to the occurrence of relative movement between one of the plugs and the sleeve. When unwanted exterior axial forces are applied to one cable, the plug which terminates that cable may slightly but the distance between the retaining ring and the end retainer does not exceed that required to cause relative movement between the plug and sleeve and hence is insufficient to cause the optical connection between the two plugs to be broken. Also, the diameter of the plug and of the opening through the end retainer and through an interior annular lip in the cap are such that upon the application of forces laterally to the plug, the plug engages the end retainer before it engages the lip thereby limiting angular movement of the plug.

16 Claims, 4 Drawing Sheets

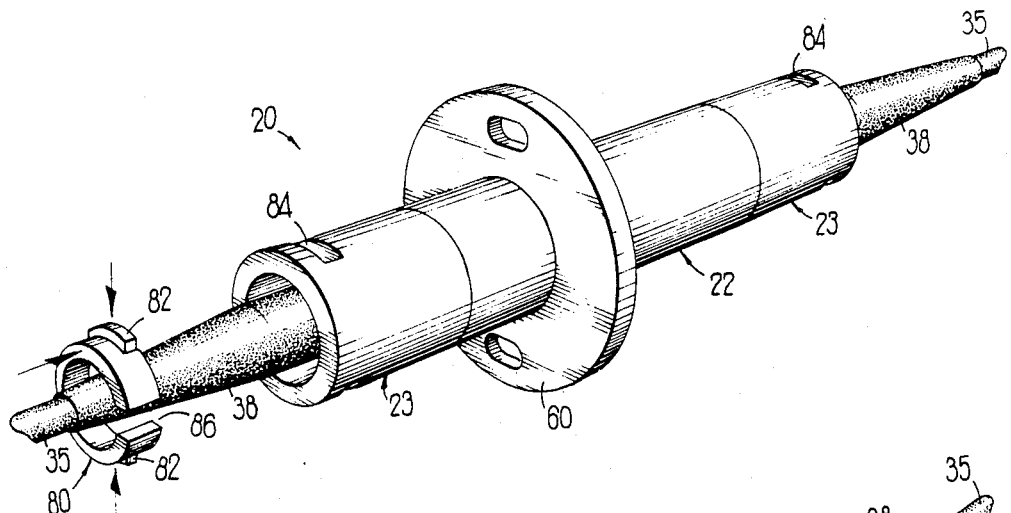
FIG 1
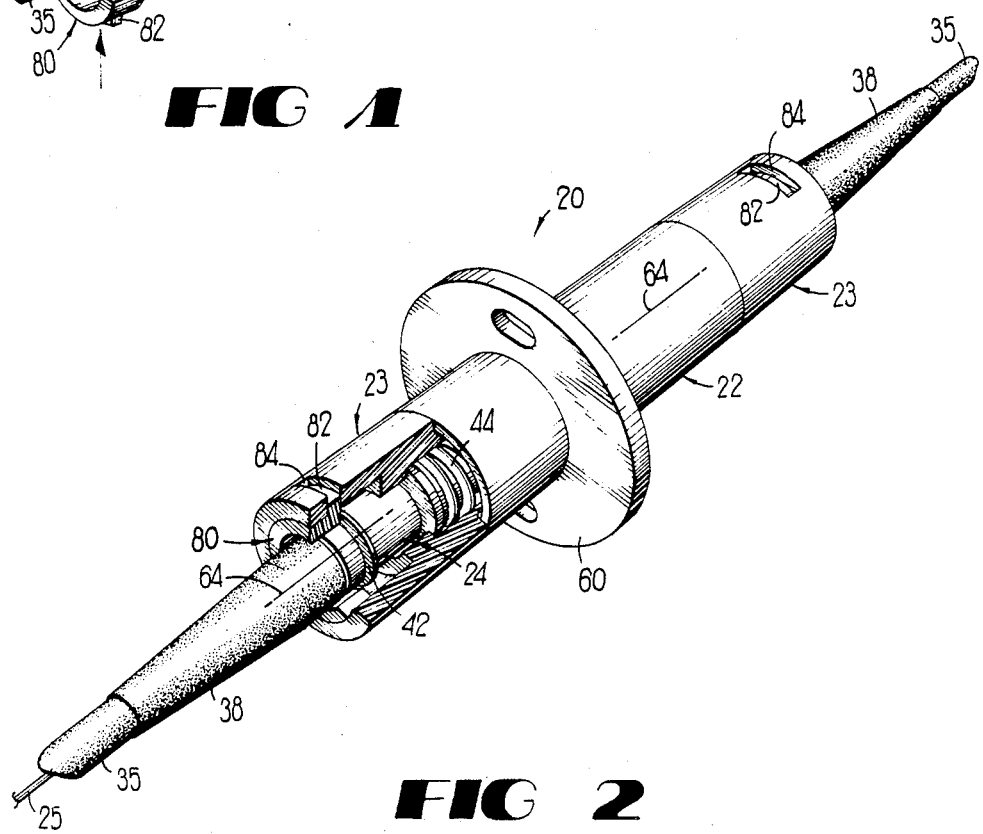
FIG 2

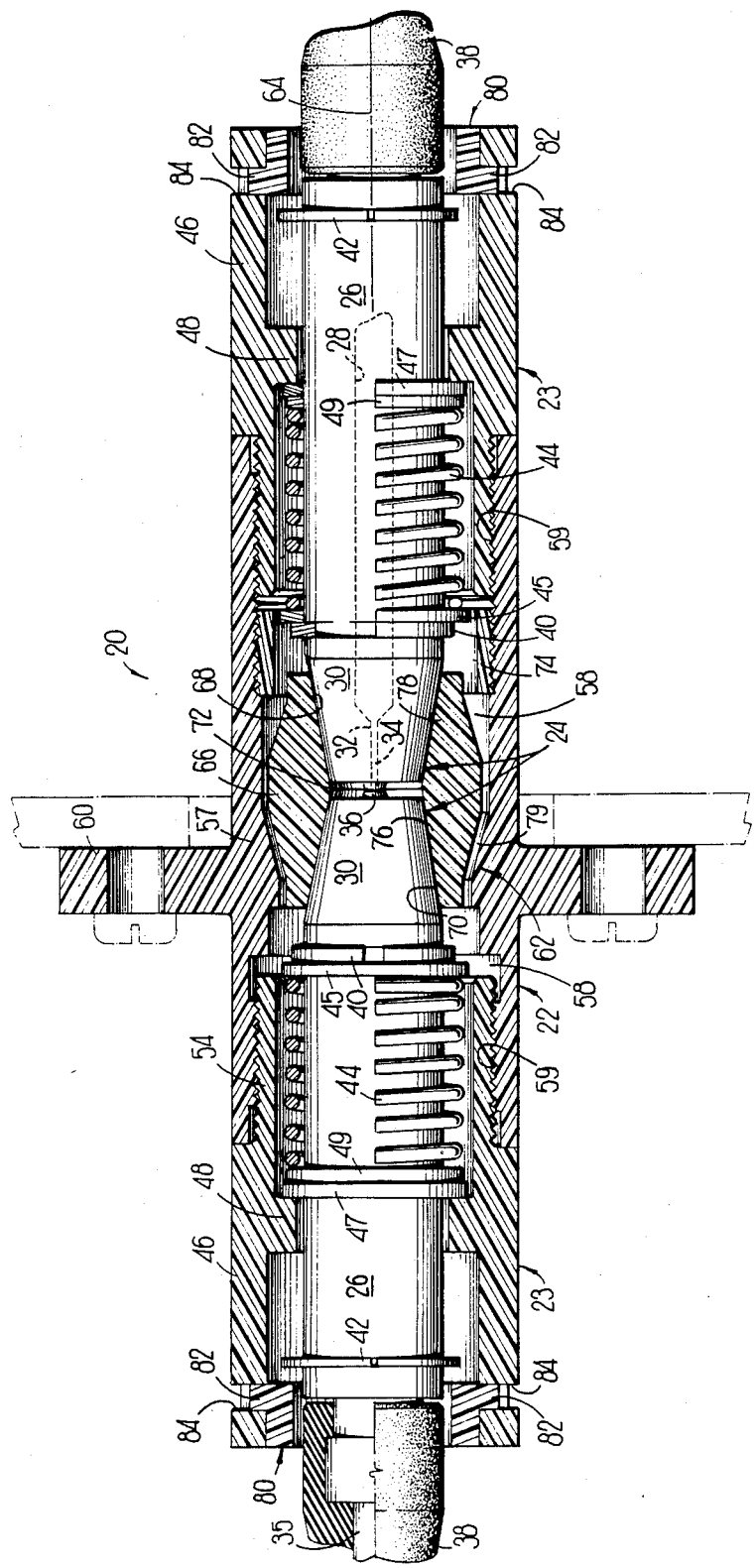
FIG 3

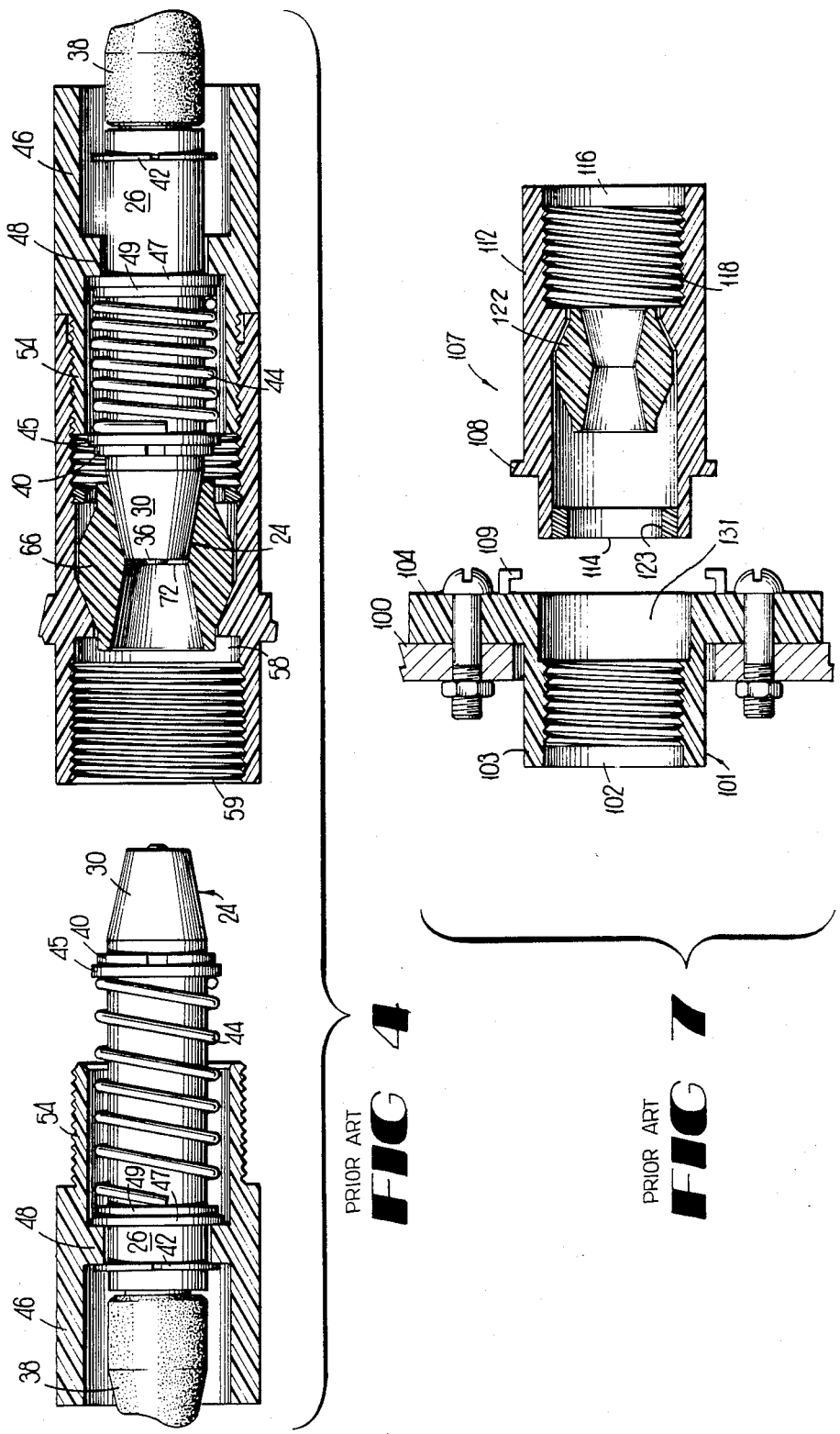
PRIOR ART
FIG. 4
PRIOR ART
FIG. 7

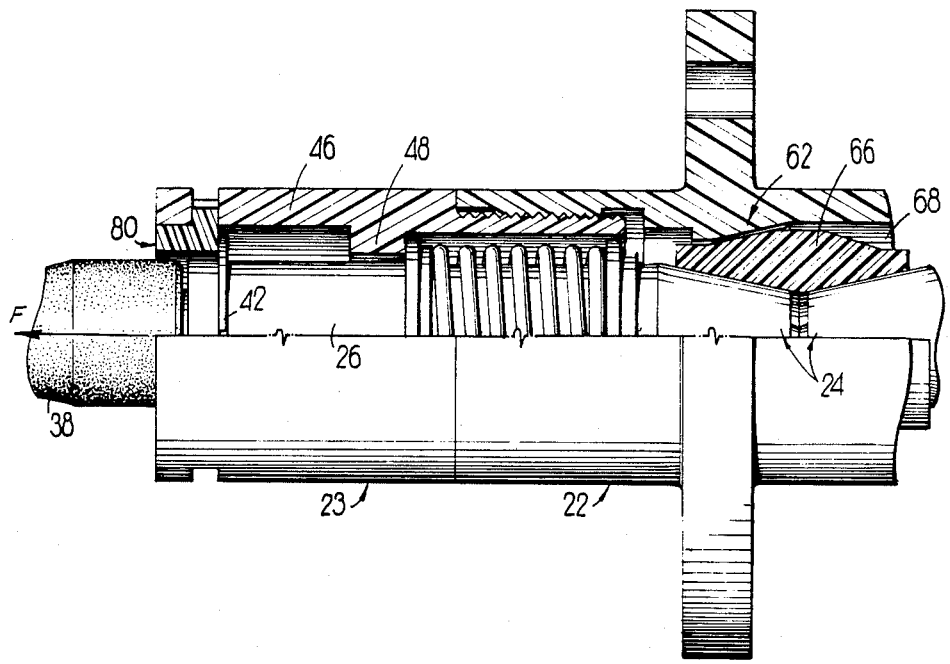
FIG 5
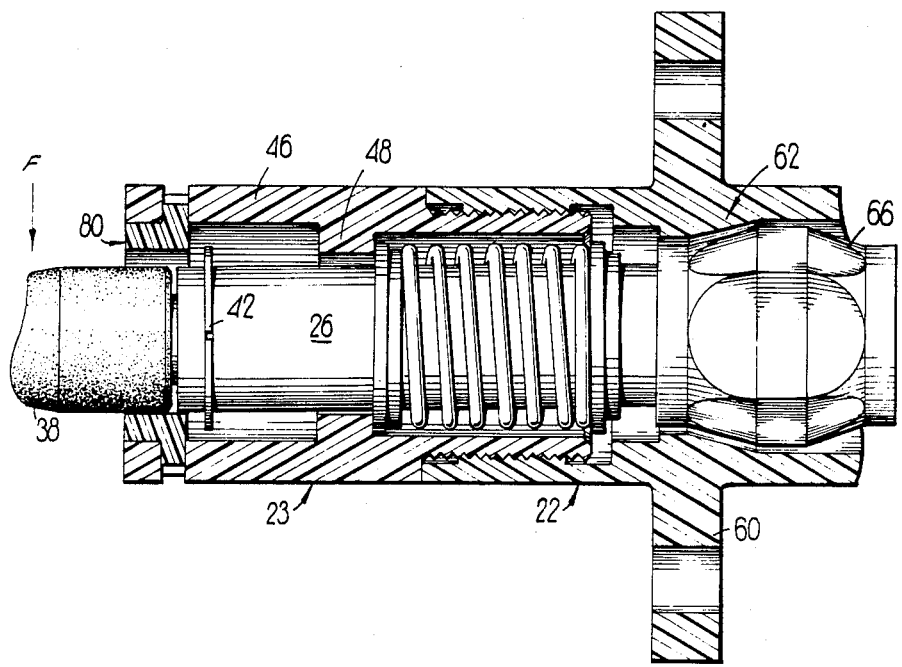
FIG 6

OPTICAL FIBER BICONIC CONNECTOR

TECHNICAL FIELD

This invention relates to optical fiber biconic connectors. More particularly, this invention relates to optical fiber connectors in which inadvertent optical disconnection between optical fiber end faces of conically shaped plugs being mounted in an alignment sleeve is prevented thereby resulting in a connection which has improved stability.

BACKGROUND OF THE INVENTION

In order that low loss optical fibers which are used in communications systems are not diminished in their effectiveness, the fibers must be connected through intermateable connectors which preserve those low losses. For optical fiber ribbons, connectors comprise grooved chips which hold a plurality of fibers of one ribbon in alignment with fibers of another ribbon. Such a connector is shown for example in U.S. Pat. No. 3,864,018 which issued on Feb. 4, 1975 in the name of C. M. Miller.

For single fiber cables, connections may be made through a connector which is referred to as a biconic connector. See, for example, an article entitled "Interconnection for Lightguide Fibers" which was authored by T. L. Williford et al. and which appeared in the Winter 1980 issue of the *Western Electric Engineer* beginning at page 87. That connector includes a coupling having a housing in which is mounted a biconic alignment sleeve. The sleeve includes two truncated, conically shaped cavities which communicate with each other through a common plane which has the least diameter of each cavity. Each of two optical fibers to be connected is terminated with a plug assembly which includes a plug comprising a primary pedestal or truncated, conically shaped end portion which is adapted to be received in one of the cavities of the sleeve. Each fiber extends through the plug in which it is mounted and has an end which terminates in a secondary pedestal of the plug. The plug is held in a cap having an externally threaded portion adapted to be turned into an internally threaded entrance portion of the housing. At least portions of the conically shaped surfaces of the plug and of the sleeve serve as alignment surfaces and are intended to be conformable. The truncated, conically shaped portion of the plug is urged by a spring which is disposed about the plug into seated engagement with the wall defining the cavity in which it is received while the cap is turned into the housing. Minimal loss between the connected fibers is achieved when the optical fibers which are terminated by the plugs are aligned coaxially and when the fiber end faces, each of which is planar, contact in a common plane.

One problem with these kinds of connectors relates to the mounting of the plugs within the sleeve. In some installations, it becomes very difficult, if not impossible, to hold the cable while turning the cap into the housing of the coupling. If the plug is not held while the cap is turned into the housing in which the sleeve is disposed, the plug will turn with the cap. If the plug turns, the end face of the plug and hence of the optical fiber terminated therewith may abrade against the plug and optical fiber already in the coupling, possibly causing damage to the optical fiber. This problem has been overcome by providing each plug assembly with a key which is mounted on the plug and which projects toward the free end of the plug in which the end of the optical fiber terminates. The sleeve has each one of its ends provided with a notch with the key of each plug assembly being adapted to be disposed in a notch at one end of the sleeve to prevent rotation of the plug with respect to the sleeve as relative rotational motion is caused between the cap of the plug assembly and the coupling.

Another problem relates to the potential for disconnection of the optical fiber end faces and the disengagement of the conically shaped plug end portions from the sleeve. It will be recalled that the conically shaped portion of the plug is biased inwardly into the housing by a spring. Should sufficient tensile force be applied inadvertently axially to the cable which is terminated by the plug, the plug will be moved in a direction outwardly from the center of the sleeve causing effectively an optical disconnection of the optical fiber end faces and hence a disconnection of optical transmission.

Also, because of the construction of the housing, the plug, upon the application of forces to the cable in a direction transversely of the longitudinal axis of the connector, will cause the plug to tilt about a fulcrum disposed between the center of the sleeve and the end of the cap. This results in a canting of the end face of the plug and angular spacing thereof from the other plug end face thereby causing optical disconnection across the plug ends.

In attempting to provide a solution to the problem of unintended longitudinal and turning movement of the plug, one must be mindful of the problem of compatibility. With many biconic connectors already in use, it would be imprudent to provide plug assemblies which overcome the problem of such unwanted movement but which are not compatible with plugs and sleeves already in use. Another kind of optical fiber connector in which unwanted optical disconnection is prevented is disclosed and claimed in commonly assigned application Ser. No. 068,585 filed of even date herewith in the names of A. W. Carlisle, et al.

Seemingly, the prior art has not yet offered a simple solution to the problem of preventing inadvertent movement of conically shaped plugs which terminate optical fibers in a biconic coupling in order to avoid unwanted optical disconnection. The sought-after connector should be one which prevents optical decoupling upon the application of both axial and transverse forces. Desirably, the plug assembly and the sleeve of the sought-after connector are ones which are compatible with connectors that already are in use in the field.

SUMMARY OF THE INVENTION

The foregoing problems have been overcome by the connector of this invention. An optical fiber connector for connecting an optical fiber to optical means includes a sleeve which includes at least one conically shaped cavity and which is adapted to have optical means disposed adjacent to and urged in a direction toward the cavity. Also, the connector includes a plug assembly including a plug which is adapted to terminate an optical fiber and which has a conically shaped end portion adapted to become seated in the cavity. A cap is assembled to the plug with the cap including an end retainer adjacent to an optical fiber entrance end of the cap. The plug assembly is adapted to be connected operatively to optical means. To accomplish this, the plug assembly includes means disposed about the plug for urging the plug outwardly of the cap so that the conically shaped end portion is capable of being received in the cavity of the sleeve with a mating surface of the plug adapted to engage a conformable mating surface of the sleeve to connect operatively the optical fiber terminated by the plug to the optical means. Upon the application of axial forces, the sleeve together with the plug seated therein and the optical means is capable of movement through a first distance prior to the occurence of any relative movement between the plug and the sleeve. The plug assembly further includes annular means disposed about the plug for holding the plug within the cap when the conically shaped end portion is not seated in the sleeve and effective when the plug becomes seated in the sleeve for becoming disposed adjacent to the end retainer and spaced a second distance, which is less than the first distance, therefrom. When axial forces are being applied to the plug of the plug assembly in a direction away from the cavity, the plug and the sleeve are restricted to move axially the second distance which is insufficient to cause the plug to be moved relative to the sleeve thereby preventing optical disconnection between the plug and the optical means.

In one embodiment, the plug has a truncated conically shaped end portion which is joined to a cylindrical portion. The plug is mounted in a cap having an externally threaded end portion beyond which extends the conically shaped end portion of the plug. A sleeve having opposed conically shaped cavities is mounted in a coupling housing which has internally threaded entrance portions. The plug is held in the cap by a first retaining ring disposed about the cylindrical portion on one side of an internally disposed annular lip. A compression spring with a washer at each end is disposed about the cylindrical portion and causes one of the washers to abut the other side of the lip. Another retaining ring is fixedly attached to the cylindrical portion adjacent to its transition into the conical portion. When the plug assembly is mounted in the sleeve, the plug is caused to be moved rearwardly in the cap compressing the spring and disposing the first retaining ring adjacent to the end retainer and spaced a predetermined distance therefrom.

BRIEF DESCRIPTION OF THE DRAWINGS

Other objects and features of the present invention will be more readily understood from the following detailed description of specific embodiments thereof when read in conjunction with the accompanying drawings, in which:

FIG. 1 is a partially exploded perspective view of a biconic connector with an end retainer being shown disassembled therefrom;

FIG. 2 is a perspective view of the biconic connector of FIG. 1 with the retainer being assembled therewith;

FIG. 3 is an elevational view of an assembled biconic connector for lightguide fiber cables which includes an alignment sleeve and two plugs each of which terminates an optical fiber;

FIG. 4 is an elevational view of a prior art biconic connector in which one of the plugs thereof is shown in a withdrawn position;

FIG. 5 a side elevational view of a portion of the arrangement of FIG. 3 and showing the connector after an axial tensile force has been applied to the cable which the plug terminates;

FIG. 6 is a side elevational view of a portion of the arrangement of FIG. 3 and showing the connector after lateral forces have been applied to the cable which the plug terminates; and FIG. 7 is an elevational view of an assembly of a lightguide buildout and buildout block in which are received two biconic connector plug assemblies.

DETAILED DESCRIPTION

Referring now to FIG. 1, there is shown a biconic connector designated generally by the numeral 20. The biconic connector 20 which is shown partially disassembled in FIG. 1 includes a coupling 22 for receiving two plug assemblies 23-23. It should be observed that FIGS. 1 and 2 are such that FIG. 2 is a view of FIG. 1 with the connector assembled completely but with a portion thereof broken away for purposes of clarity. Each plug assembly 23 includes a plug 24 which terminates a lightguide or optical fiber 25. As can be seen in FIG. 3, each plug 24 includes a cylindrical portion 26 which includes a bore 28, and an end portion 30. The end portion 30, which is referred to as a primary pedestal, has a truncated conical shape and includes a passageway 32 that communicates with the bore 28.

A coated single optical fiber 25 (see FIG. 2) which is terminated with a plug 24 may be jacketed with a plastic material such as polyvinyl chloride to form a jumper cable 35. The jacketing material and the coating are removed from an end portion 34 (see again FIG. 3) of the single fiber cable. Then, the cable is inserted into the bore 28 until the bared end portion 34 is received in the passageway 32 with an end portion of the fiber 25 extending into a secondary pedestal 36. An end face of the end portion 34 of the fiber 25 is coincident with the end face of the secondary pedestal 36. The cable at its exit from the bore 28 is provided with a strain relief member 38.

Each plug 24 is provided with a retaining ring and a washer adjacent to its end portion 30. As can be seen in FIGS. 3 and 4, each of the plugs 24-24 is provided with a retaining ring 40 which abuts a washer 45 and which is fixedly located about the plug 24. FIG. 4 depicts a prior art biconic connector and the numerals used to designate the elements of the connector in FIG. 4 are the same as those used to designate corresponding elements of the connector of this invention. A compression spring 44 is disposed about the cylindrical portion 26 of the plug between the washer 45 and another pair of washers 47 and 49. The plug 24 is positioned in an end portion of a holder or cap 46 with the washer 47 and another retaining ring 42 in engagement with an annular lip 48 to hold the plug within the cap (see left side of FIG. 4). The retaining ring 42 is fixedly attached to the cylindrical portion 26 of the plug 24 whereas the washer 47 is disposed moveably thereon. One end of the cap 46 includes an externally threaded portion 54 with the single fiber cable 35 extending from the other end of the cap, the other end being referred to as the cable or optical fiber entrance end.

As mentioned hereinbefore, the coupling 22 (see FIGS. 1-4) of the connector 20 is adapted to receive the two threaded plug caps 46-46 and two plugs 24-24. The coupling 22 comprises a housing 57 which includes two opposed cavities 58-58 each having a threaded portion 59 and which may or may not include a flange 60 adapted to be mounted to a supporting surface. The flange 60 is aligned with an internally disposed annular collar 62 which extends toward a longitudinal axis 64 (see FIG. 3) of the connector. The housing 57 of the coupling 22 also is adapted to receive an alignment sleeve 66 which comprises two opposed truncated, conically shaped cavities 68 and 70 which meet at a common plane 72.

Both the plug 24 and the sleeve 66 are made of a crushed silica-filled, transfer molding grade epoxy composition, for example, whereas the housing 57 is made of a plastic material, for example. However, it should be understood that the plug and sleeve could be made of other materials, such as metallic materials, for example.

The alignment sleeve 66 is disposed within the housing 57 so that when the caps 46-46 and the external threaded portions 54-54 thereof are turned into internal threaded portions 59-59 in the cavities 58-58, the ends 30-30 of the plugs which are mounted in associated caps are received in cavities 68 and 70 with the secondary pedestals 36-36 in the vicinity of a common plane 72. Also, as the threaded portions 54-54 of the caps 46-46 are turned into the housing 57, the plug portions 26-26 are moved through the openings defined by the lips 48-48 to move the retaining rings 42-42 out of engagement with the lips (see FIGS. 3). Prior to the turning of a cap 46 of a plug assembly 23 into the housing 57, the spring 44 thereof is in compressive engagement with the washer 47 which engages one side of the lip 48 and biases the plug outwardly of the cap. As a result, the retaining washer 42 is caused to be held in engagement with an opposite side of the annular lip 48. This latter condition is shown in FIG. 4 which shows a prior art biconic connector.

The retaining ring 40 of the right hand plug as viewed in FIG. 3 is adjacent to an externally threaded collar 74 which is turned threadably into the right hand cavity 58, as viewed in FIG. 3, and which holds the sleeve 66 within the housing 57. The collar 74 is threadably secured inside the coupling 22 and although not necessarily in engagement with the sleeve, it prevents the sleeve from being removed inadvertently from the housing. The spring 44 causes the right hand plug end portion 30 to be seated firmly in engagement with a wall 78 of the cavity 68 of the alignment sleeve 66. Further, the left plug end 30 as viewed in FIG. 3 is moved into the cavity 70 of the sleeve 66 and contacts a wall 76. It is important to recognize that the sleeve 66 floats within an opening 79 between the collar 62 and the threaded collar 74 to facilitate alignment of the two plugs 24-24. As a result, upon the application of axial forces to either one of the plugs 24-24, such as for example by the application of tensile forces to one of the cables 35-35, the sleeve, together with the plugs seated in the cavities thereof, is capable of movement through a distance, termed herein the first distance, prior to the occurence of any relative movement between the sleeve and either of the plugs.

Ideally, to achieve minimum loss, the plugs 24-24 disposed within the sleeve 66 should have their longitudinal axes aligned and end faces to the fibers with the secondary pedestals 36-36 contacting each other. The outer surface of the conical end 30 of each plug 24 and the surfaces of the walls 76 and 78 of the sleeve cavities are associated conformable alignment surfaces which are intended to cause the desired positioning of the pedestals 36-36 when the conical ends of the plugs are received in the sleeve 66. When disposed in the alignment sleeve 66, the plugs 24-24 should have a desired end separation based on the distance between reference boundaries of the cavities 68 and 70. Likewise the so-called taper length of each plug, defined as the distance from a reference circumference on the plug boundary to the end face of the secondary pedestal 36, should be a specified distance.

Viewing now the right side of FIG. 4, it should be apparent that the end of each prior art cap 46 is open and that the opening therein is large enough to permit passage of the retaining ring 42. Consequently, should axial tensile forces be applied to one of the cables 35-35, the spring 44 is compressed and the plug assembly is moved in a direction away from the center of the coupling housing. It may be moved a distance which is greater than the first distance and which is sufficient to cause relative movement between the plug of the cable which is pulled and the sleeve and hence cause movement of the secondary pedestals of the two plugs within the housing, resulting in an optical disconnection of the two optical fibers terminated by the plugs.

Furthermore, undesired results also occur should lateral forces be applied to the cables or plug assembly of the prior art connector. In that event, the cylindrical portion of the plug engages the annular lip 48 (see again FIG. 4) causing the plug to move pivotally about the lip which acts as a fulcrum. As a result, the secondary pedestal of the pivotally moved plug becomes canted causing optical disconnection between the optical fibers.

The connector 20 of this invention includes provisions for overcoming these problems. As can be seen in FIGS. 1-3, 5 and 6, each cap 46 is provided with an end retainer 80 adjacent to the cable entrance end of the cap. As can best be seen in FIG. 1, the end retainer includes two diametrically opposed tabs 82-82. Each tab 82 is designed to be received in an opening 84 in the housing of the cap. It is within the scope of this invention to provide an annular end retainer adapted to have a portion thereof received in a groove at the cable entrance end of the cap, or the end retainer could be provided with one or more tabs, or could be bonded to the cap. The end retainer 80 preferably is in the form of a split ring having a slot 86 (see FIG. 1) to allow the end retainer to be collapsed for installation.

A retaining ring 42 is attached to the cylindrical portion 26 of each plug so that when the plug portion 30 is seated in the sleeve 66, the retaining ring is disposed adjacent to the end retainer 80 and spaced a predetermined distance therefrom. The predetermined distance, which is referred to as the second distance, is less than the first distance, referred to hereinbefore with respect to movement of the sleeve together with the plugs therein.

Advantageously, the end retainer 80 is sized so that the retaining ring 42 cannot pass therethrough. Hence, when axial tensile forces "F" are applied to the cable 35, the associated plug 24 is moved outwardly of the coupling housing only slightly through the second distance until the retaining ring 42 engages the end retainer 80 (see FIG. 5). The movement is controlled so that optical disconnection of the two optical fibers is prevented.

It is important to recognize that even though the retaining ring 42 is moved a slight distance, i.e. the second distance, before it engages the entrance retainer 80 (compare FIGS. 3 and 5), the optical connection between the secondary pedestals is not broken. If axial forces are applied to the cable 35 on the left side of FIG. 3, the spring 44 on that side is compressed. However, the compression spring associated with the right hand side of FIG. 3 urges its associated plug to the left thereby maintaining optical connection between the optical fibers in the secondary pedestals. This is further facilitated because as explained hereinbefore the sleeve 66 floats within the housing. As a result, the sleeve 66 can be moved the first distance to the left as viewed in FIG. 3 prior to the sleeve becoming seated within the coupling housing. Because of the relationship between the first and second distances, the second distance through which the retaining ring 42 is moved before it engages the end retainer 80 is such that the retaining ring engages the end retainer before the sleeve 66 becomes seated in the housing 57. This arrangement prevents unwanted optical disconnection between the optical fibers terminated by the plugs.

Of course, as can further be seen by viewing FIG. 3, movement of the sleeve 66 to the right although limited by the collar 74 is not even close to engagement with any other portion of the housing when and if the retaining ring 42 on the right side is caused by the application of axial forces to the right hand cable 35 to be moved to engage its associated end retainer 80.

Advantageously, the connector 20 of this invention is compatible with existing connectors in the field. For example, if all new jumper cables 35-35 were to be provided with plugs 24-24 each having an end retainer, it becomes important that such plugs are useable with coupling housings and sleeves already in place in the field. As should be apparent, the use of a cap having an end retainer in no way impedes its use with a prior art coupling and sleeve. Furthermore, a plug which is provided with an end retainer of this invention may be coupled to one which does not. As a result, the fact that the plug is provided with an end retainer does not impede its assembly with a prior art sleeve or other biconic connector plug.

The use of the end retainer also is helpful in preventing the canting of the plug through a sufficient angle to affect adversely the connection. As can be seen in FIG. 4, the application of forces laterally of the longitudinal axis of the cable will cause the plug body to move in the direction of the applied forces until it engages the annular lip 48 whereupon continued application of forces in the same direction will cause the plug body to turn pivotally about the annular lip which acts as a fulcrum. This may result in disconnection between the optical fibers and loss of transmission. Unlike the prior art connector of FIG. 4, the application of lateral forces "F" to the plug body in FIG. 3 will cause the plug to engage the inner annular surface of the end retainer 80 before the plug body engages the annular lip 48 (see FIG. 6). As a result, pivotal movement of the plug within the cap is eliminated substantially thus preserving the connection of the optical fibers terminated by the plugs disposed within the coupling housing 57.

Other embodiments are within the scope of the invention. For example, the sleeve may include only one conically shaped cavity for receiving a plug 24. In that instance the sleeve may be adapted to be connected to an optical means or an optical assembly such as a device or a termination for an optical fiber to cause the connection of light paths between the optical fiber terminated by the plug and the device or other optical fiber termination means.

In another application of this invention, and equipment panel 100 (see FIG. 7) is used as an interconnection cabinet for bulkhead mounted connectors. The equipment panel 100 includes one or a plurality of buildout blocks 101-101, for example. A plurality of buildout blocks 101-101 may be provided in a cabinet. An entrance cable is routed into the building and each optical fiber thereof is connected to a single fiber jumper cable which has an end terminated in a biconic connector plug assembly. Each of these biconic connector plug assemblies is inserted into an entrance end 102 of a housing 103 of a buildout block 101 which is secured to the panel 100 through a flange 104. As a result, an equipment panel has fibers of the cable connected to an array of buildout blocks which are secured to the panel. Subsequently, as particular ones of the optical fibers are to be connected to equipment, a lightguide buildout 107 is mounted to a block already in the panel through joining snap-lock tabs 108 into slots 109-109. The buildout 107 includes a housing 112 having an end 114 adapted to be received in the flanged end of the buildout block and another end 116 which has an entrance defined by a wall that is provided with internal threads 118. An alignment sleeve 122 which may be identical to the sleeve 66 is secured within the buildout 107 by a retaining ring 123. After the buildout 107 has been mounted to the buildout block 101, a plug 24 is inserted into the entrance 116 of the buildout 107 and its associated cap turned into the housing 112 of the buildout.

As for installation of the arrangement in of in FIG. 7, a biconic plug assembly is turned threadably into the entrance 102 of the buildout block 101 which is mounted on a panel 100 in the equipment cabinet. The plug to be received in the entrance end 102 terminates a fiber of the incoming cable and remains unused until such time as a buildout 107 is snap-locked into a cavity 131 of the buildout block. No plug is in position on the other side 116 of the buildout at this time, but is inserted subsequently.

It is to be understood that the above-described arrangements are simply illustrative of the invention. Other arrangements may be devised by those skilled in the art which will embody the principles of the invention and fall within the spirit and scope thereof.

What is claimed is:

1. An optical fiber connector for connecting an optical fiber to an optical means, said connector comprising:

a plug assembly which includes a plug having a conically shaped portion and being adapted to terminated an optical fiber, a cap which is assembled to said plug and which includes an end retainer adjacent to an optical fiber entrance end of said cap and resilient means for urging said plug outwardly of said cap in a direction away from the optical fiber entrance end;

sleeve means including at least one conically shaped cavity which is adapted to have said conically shaped portion of said plug seated therein and being adapted to have an optical means disposed adjacent to and urged in a direction toward said cavity to establish an optical connection with the optical fiber such that upon the application of axial forces to said plug, said sleeve means together with said plug seated therein and the optical means being capable of movement through a first distance prior to the occurence of relative movement between said plug and said sleeve means; and said plug assembly further including retaining means connected to said plug for holding said plug within said cap when said conically shaped portion is not seated in said cavity and effective when said plug becomes seated in said sleeve means for becoming disposed a second distance, which is less than the first distance, from said end retainer so that upon the application of axial forces to said plug in a direction away from said cavity, said plug and said sleeve means are restricted to move axially the second distance which is insufficient to cause the plug to be moved relative to said sleeve means thereby preventing optical disconnection between the plug and the optical means.

2. An optical fiber connector for connecting two optical fibers, said connector comprising:

first and second plug assemblies each including a plug having a truncated conically shaped portion which is adapted to terminate an optical fiber, and a cap which is associated with and assemblied to said plug such that relative rotational motion between said cap and said plug can occur with said cap of at least one of said plug assemblies including an end retainer adjacent to an optical fiber entrance end thereof;

a sleeve for receiving the conically shaped portion of the plug of said first plug assembly in one end cavity thereof and the conically shaped portion of the plug of said second plug assembly in another end cavity thereof with a mating surface of each plug adapted to engage a conformable mating surface of said sleeve to become seated therein, said sleeve including a longitudinal axis which extends from the one end to the other end thereof;

energy storage means disposed about each of said plugs for causing said plug to be biased outwardly of its associated cap so that said conically shaped portion of the plug is capable of being received in one of the cavities of said sleeve;

coupling means for suspending said sleeve therein in a manner which upon the application of axial forces to one of the plugs allows said sleeve with said plugs therein to be moved through a first distance in a direction along the longitudinal axis of the sleeve relative to said coupling means prior to the occurence of relative movement between said plugs;

means for securing each of said plug assemblies to said coupling; and annular means disposed about each said plug adjacent to its optical fiber entrance end for holding each said plug within its associated cap and effective when said conically shaped portion of said plug becomes seated in a cavity of said sleeve for becoming disposed a second distance, which is less than the first distance, from said end retainer so that upon axial forces being applied to one of the plugs, said plug is restricted to be moved axially the second distance which is insufficient to cause said one plug to be moved relative to the other plug and thereby cause optical disconnection between the ends of said plugs.

3. The optical fiber connector of claim 2, wherein said sleeve is disposed within a housing of said coupling means and is capable of being moved therein.

4. The optical fiber connector of claim 3, wherein said cap of each of said plug assemblies includes at least one opening adjacent to the optical fiber entrance end thereof and said end retainer includes at least one tab extending radially therefrom with said at least one tab being received in said opening.

5. The optical fiber connector of claim 3, wherein said plug of each plug assembly includes a truncated conically shaped end portion and a cylindrical portion connected thereto, said truncated conically shaped portion extending beyond an end of said cap, said cylindrical portion having a compression spring disposed thereabout to bias said plug into said sleeve with each end of said spring engaging a washer which is disposed about said plug with one of the washers engaging an annular inwardly projecting lip of the associated cap and wherein a first retaining ring is fixedly disposed about said cylindrically shaped portion adjacent to said truncated conically shaped portion and in engagement with the other one of the washers, and wherein said annular means is a second retaining ring secured to said cylindrical portion of said plug, said second retaining ring engaging said annular lip when said plug is not seated in one of the cavities of said sleeve.

6. The optical fiber connector of claim 5, wherein said housing includes an internally threaded portion at each end thereof for receiving an externally threaded portion of one of said plug assemblies.

7. The optical fiber connector of claim 5, wherein said second retaining ring is attached to said plug so that when portions of said plugs are in optical engagement with each other, said retaining ring is spaced from said end retainer the second distance which is less than that which said sleeve must be moved to seat in engagement with an internal surface of said housing.

8. The optical fiber connector of claim 5, wherein the difference between the diameter of each end retainer and each plug is less than the difference between said annular lip and each plug so that upon the application of lateral forces to a plug, said plug will engage said end retainer prior to engaging said lip.

9. A plug assembly for terminating an optical fiber, said plug assembly comprising:

a cap having an optical fiber entrance end and an opposite open end;

a plug which includes a truncated conically shaped portion adapted to be received in a conically shaped cavity of a sleeve and which includes a passageway extending therethrough and being adapted to receive an end portion of an optical fiber, said plug being mounted in said cap;

means disposed about said plug for urging said plug in a direction away from said fiber entrance end;

retaining means connected to said cap including an end retainer adjacent to its fiber entrance end for reducing the cross sectional area of said optical fiber entrance end; and annular means disposed about said plug and effective for holding said plug in said cap when said plug assembly is not operatively connected to other optical means and effective when said plug is connected operatively to another optical means for becoming disposed a predetermined distance from said end retainer so that upon the application of axial forces to said plug in a direction away from a connection, said plug is restricted to move axially a distance which is insufficient to cause disconnection with the optical means.

10. The plug assembly of claim 9, wherein said plug is mounted in said cap such that relative motion therebetween can occur and said cap is adapted to be assemblied to a housing in which said sleeve is disposed as a result of rotary motion between said cap and the housing, said plug mounted in said cap with said cap enclosing at least a portion of said plug, said passageway adapted to receive an optical fiber therein such that the optical fiber terminates in an end face of the plug which extends from the cap beyond an end thereof, and said end retainer including diametrically opposed tabs extending radially outwardly therefrom, each said tab being received in an opening of said cap.

11. The plug assembly of claim 9, wherein said plug has a truncated conically shaped end portion and said annular means includes a retaining ring which is disposed about said plug adjacent to said end retainer, said end retainer having an opening therethrough which is larger than the cross-sectional area of said plug but which is less than an outer diameter of said retaining ring.

12. The plug assembly of claim 11, wherein said retaining ring is attached to said plug so that when two of said plugs are in engagement with the walls of a sleeve having opposed conically shaped openings, each said retaining ring is spaced from an end retainer a distance which is less than that said sleeve must be moved to seat in engagement with a mateable surface of the housing.

13. The plug assembly of claim 12, wherein the difference between the diameter of said end retainer and said plug is less than the difference between an annular interior lip of said cap and said plug so that upon the application of lateral forces to said plug, said plug will engage said end retainer prior to engaging said interior lip.

14. A plug assembly which terminates an optical fiber, said plug assembly comprising:
a cap which is adapted to be assembled to a housing as a result of rotary motion between said cap and the housing and which includes an end retainer mounted adjacent to an optical fiber entrance portion of said cap, said cap including a first cavity and a second cavity with the first cavity separated from the second cavity by an annular lip, and with the portion of the cap which defines said first cavity being threaded externally;
a plug which includes a passageway extending therethrough and which is mounted in said cap such that said cap encloses at least a portion of the plug and such that relative rotational motion between said cap and said plug can occur, the plug including a truncated conically shaped end portion and a cylindrically shaped portion which is disposed in said cap with the conically shaped end portion extending beyond said cap;
an optical fiber which is positioned in the passageway of said plug and which terminates in an end conically shaped portion of the plug, said plug extending from said cap beyond the optical fiber entrance end thereof;
retainer means including retaining rings mounted on and disposed about said cylindrical portion of said plug with one of the retaining rings being disposed on one side of said annular lip for holding said plug in said cap, and, upon the plug assembly becoming operatively connected to other optical means, said one retaining ring becoming disposed adjacent to said cable entrance end thereof and spaced a predetermined distance from said end retainer of said cap so that upon the application of forces to said plug in a direction from said truncated conically shaped portion to said optical fiber entrance portion of said cap, said plug is restricted in movement to said predetermined distance, and another retaining ring being disposed adjacent to the truncated conically shaped end portion of the plug;
a pair of washers disposed about said cylindrical portion of said plug, one adjacent to its juncture with the conically shaped portion and the other adjacent to said annular lip; and
a compression spring which is disposed between said washers to cause said plug to be urged outwardly of said cap and effective prior to the seating of the plug in a sleeve to cause the one retaining ring to engage said annular lip.

15. The plug assembly of claim 14, wherein the difference between the diameter of the plug and the inner diameter of the end retainer is less than the difference in diameters of the plug and the annular lip so that upon the application of lateral forces to the plug, the plug engages the end retainer before engaging the lip.

16. An optical fiber connection, which includes:
a coupling which includes a housing having opposed cavities each having an internally threaded entrance portion and which includes a longitudinal axis;
first and second plug assemblies each being mounted to said coupling and each including:
a plug having a truncated conically shaped end portion and a passageway extending therethrough;
a cap associated with said plug and in which said plug is mounted with a threaded portion thereof engaged with a threaded portion of said housing, said cap capable of being turned rotatably with respect to said plug, said cap including an optical fiber cable entrance end, and an end retainer mounted in said cap adjacent of the optical fiber cable entrance portion thereof; and
spring means disposed about said plug and being effective to urge said plug in a direction away from said cable entrance end; and
an optical fiber cable including an optical fiber end portion which is disposed in the passageway of each of said plugs with an end of each fiber terminating in an end face of the plug in which it is mounted;
sleeve means disposed in said housing and having opposed cavities in each of which is disposed one of said truncated conically shaped portions of said plugs, with walls which define the cavities including surfaces conformable to and mating with outer surfaces of said plugs, said sleeve means together with the plugs therein being capable of movement through a first distance in a direction along the longitudinal axis of the coupling and relative thereto prior to the occurence of relative movement between a plug and the sleeve means; and
retaining means disposed about each said plug for holding said plug within its associated cap and effective upon said plug assembly being secured to said housing and said truncated conically shaped portions becoming disposed in said sleeve for becoming disposed adjacent to said end retainer and spaced a second distance, which is less than the first distance, therefrom such that upon the application of axial forces to one of the cables, the plug which terminates the cable to which forces are applied is restricted to axial movement equal to the second distance which is insufficient to cause relative movement between the truncated conically shaped end portions of the plugs thereby preventing optical disconnection between the optical fibers.

* * * * *